(12) United States Patent
Bean

(10) Patent No.: US 7,920,705 B1
(45) Date of Patent: Apr. 5, 2011

(54) SYSTEM AND METHOD FOR CONVERT CHANNEL DETECTION

(75) Inventor: Reginald D. Bean, Center Point, IA (US)

(73) Assignee: Rockwell Collins, Inc., Cadar Rapids, IA (US)

( * ) Notice: Subject to any disclaimer, the term of this patent is extended or adjusted under 35 U.S.C. 154(b) by 1153 days.

(21) Appl. No.: 11/493,727

(22) Filed: Jul. 26, 2006

(51) Int. Cl.
*H04M 1/66* (2006.01)
*G05B 19/00* (2006.01)

(52) U.S. Cl. ............ 380/270; 380/43; 380/45; 380/264; 380/255

(58) Field of Classification Search ........................ None
See application file for complete search history.

(56) References Cited

U.S. PATENT DOCUMENTS

| | | | |
|---|---|---|---|
| 5,577,209 A | 11/1996 | Boyle et al. | 395/200.06 |
| 5,692,124 A | 11/1997 | Holden et al. | 395/187.01 |
| 5,802,178 A | 9/1998 | Holden et al. | 380/49 |
| 5,828,832 A | 10/1998 | Holden et al. | 395/187.01 |
| 5,832,228 A | 11/1998 | Holden et al. | 395/200.55 |
| 5,872,847 A | 2/1999 | Boyle et al. | 380/25 |
| 5,940,591 A | 8/1999 | Boyle et al. | 395/187.01 |
| 6,067,620 A | 5/2000 | Holden et al. | 713/155 |
| 6,212,636 B1 | 4/2001 | Boyle et al. | 713/168 |
| 6,272,538 B1 | 8/2001 | Holden et al. | 709/223 |
| 6,272,639 B1 | 8/2001 | Holden et al. | 713/201 |
| 6,643,698 B2 | 11/2003 | Holden et al. | 709/225 |
| 6,760,768 B2 | 7/2004 | Holden et al. | 709/227 |
| 6,993,582 B2 | 1/2006 | Holden et al. | 709/225 |
| 2003/0005331 A1* | 1/2003 | Williams | 713/201 |
| 2004/0083389 A1* | 4/2004 | Yoshida | 713/201 |
| 2005/0188079 A1* | 8/2005 | Motsinger et al. | 709/224 |
| 2006/0020800 A1* | 1/2006 | Holden et al. | 713/171 |
| 2007/0214503 A1* | 9/2007 | Shulman et al. | 726/22 |

OTHER PUBLICATIONS

Rockwell Collins, Common Crypto Circuit Card Assembly, Rockwell Collins, Inc, Revision D, p. 4.*
Vincent Berk et al. Detection of Covert Channel Encoding in Network Packet Delays, Dartmouth College Hanover, NH, Technical Report TR536, Revision 1.*
"A Guide to Understanding Covert Channel Analysis of Trusted Systems," Nov. 1993, 62 pages, National Computer Security Center, Ft. George G. Mead, Maryland.
Castro, Simon, "Covert Channel and Tunneling over the HTTP protocol Detection: GW implementation theoretical design," Nov. 2003, 16 pages, vol. 1.1.
Kemmerer, Richard A, "Shared Resource Matrix Methodology: An Approach to Identifying Storage and Timing Channels," Aug. 1983, 24 pages, ACM Transactions on Computer Systems, vol. 1, No. 3.

* cited by examiner

*Primary Examiner* — Brandon S Hoffman
*Assistant Examiner* — Nega Woldemariam
(74) *Attorney, Agent, or Firm* — Matthew J. Evans; Daniel M. Barbieri

(57) ABSTRACT

A communication system comprises a covert channel detector. The covert channel detector can be used in a multi-level security system (MLS) or multiple single levels of security (MSLS). The covert channel detector detects covert channels in a cryptographic system. The cryptographic system can be used in a military radio system.

20 Claims, 2 Drawing Sheets

SYSTEM AND METHOD FOR CONVERT CHANNEL DETECTION

BACKGROUND OF THE INVENTION

Conventional modern communication and some conventional modern navigation systems employ at least some form of information security and, hence often require cryptography. A conventional transceiver system for a radio or network may comprise numerous processing subsystems for each channel. For example, a transceiver system may contain a digital signal processing subsystem, a black processing subsystem, a cryptographic subsystem, a red processing subsystem, etc. for each channel. In military communication systems and selected commercial communication systems the cryptographic system and method employed are often computationally complex. Mandates from the National Security Agency (NSA) and the Department of Defense (DOD) provide various criteria for cryptographic systems.

Some cryptographic systems provide multi-level security (MLS) or multiple independent levels of security (MILS) or multiple single levels of security (MSLS). MLS and MILS systems can be utilized where classified and unclassified systems operate in parallel on the same machine. Subsystems allow a process (an operating system) that operates at a top secret level and a process that operates at less than the top secret level to be performed in parallel on the same platform without a concern that data from one process is interchanged with data of another process. Such systems typically utilize a processing unit and memory storage and can operate on computing platforms like Java™ platforms.

One conventional MILS system utilizes a proprietary microprocessor, the AAMP7™ microprocessor manufactured by Rockwell Collins, Inc. The AAMP7 microprocessor is MILS certified and provides the platform for a Janus™ cryptographic engine.

Heretofore, a cryptographic system could be potentially subverted by the use of a covert channel. The covert channel is generally established in a manner unknown to the system and illegal to the system. The covert channel can be used to transfer information from an inside party to an outside party without the system being aware of the transfer. Such a covert channel could result in the loss of critical technology, critical program information and confidential field or other data. Covert channels can be difficult to detect in conventional cryptographic systems. The National Security Agency considers covert channels a significant security concern.

The problems associated with a covert channel detection are exacerbated when used in a complicated MLS or MILS system where multiple independent levels of security must be maintained. Heretofore, efficient covert channel detection has not been accomplished in MLS or MILS systems.

Therefore, there is a need for a system and a method that overcomes one or more of the deficiencies described above. There also is need for a system for and method of detecting the presence of covert channels. There is still another need for a system for and method of automatically detecting a covert channel in a MLS, MILS or MSLS system.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a communication system. The communication system includes a cryptographic engine, statistics collectors, and a covert channel detector. The cryptographic engine is coupled to communication channels which include encrypted channels and non-encrypted channels. The statistic collectors are each respectively coupled to the communication channels. The covert channel detector is coupled to the statistics collectors and analyzes data from at least one of the statistics collectors to determine a presence of a covert channel.

Another exemplary embodiment relates to a method of providing communication in a multiple independent level security (MILS) or a multiple independent single levels of security (MSLS) communication system. The method includes encrypting signals for encrypted channels. Each of the encrypted channels is at a particular security level. The method also includes decrypting signals for decrypted channels. Each of the decrypted channels is at a respective security level corresponding to the particular security level associated with one of the encrypted channels. The method also includes collecting statistics on each of the decrypted channels and encrypted channels and analyzing the statistics to determine a presence of a covert channel.

Still another exemplary embodiment relates to an apparatus. The apparatus includes means for providing encrypted communication on encrypted channels and for providing communication on non-encrypted channels. The apparatus also includes means for collecting statistics regarding communications on the encrypted channels and the non-encrypted channels. The apparatus also includes means for analyzing the statistics to determine a presence of a covert channel.

BRIEF DESCRIPTION OF THE DRAWINGS

The invention will become more fully understood from the following detailed description, taken in conjunction with the accompanying drawing, wherein like reference numerals refer to like elements, in which.

DETAILED DESCRIPTION OF THE PREFERRED EMBODIMENTS

Figure 1:
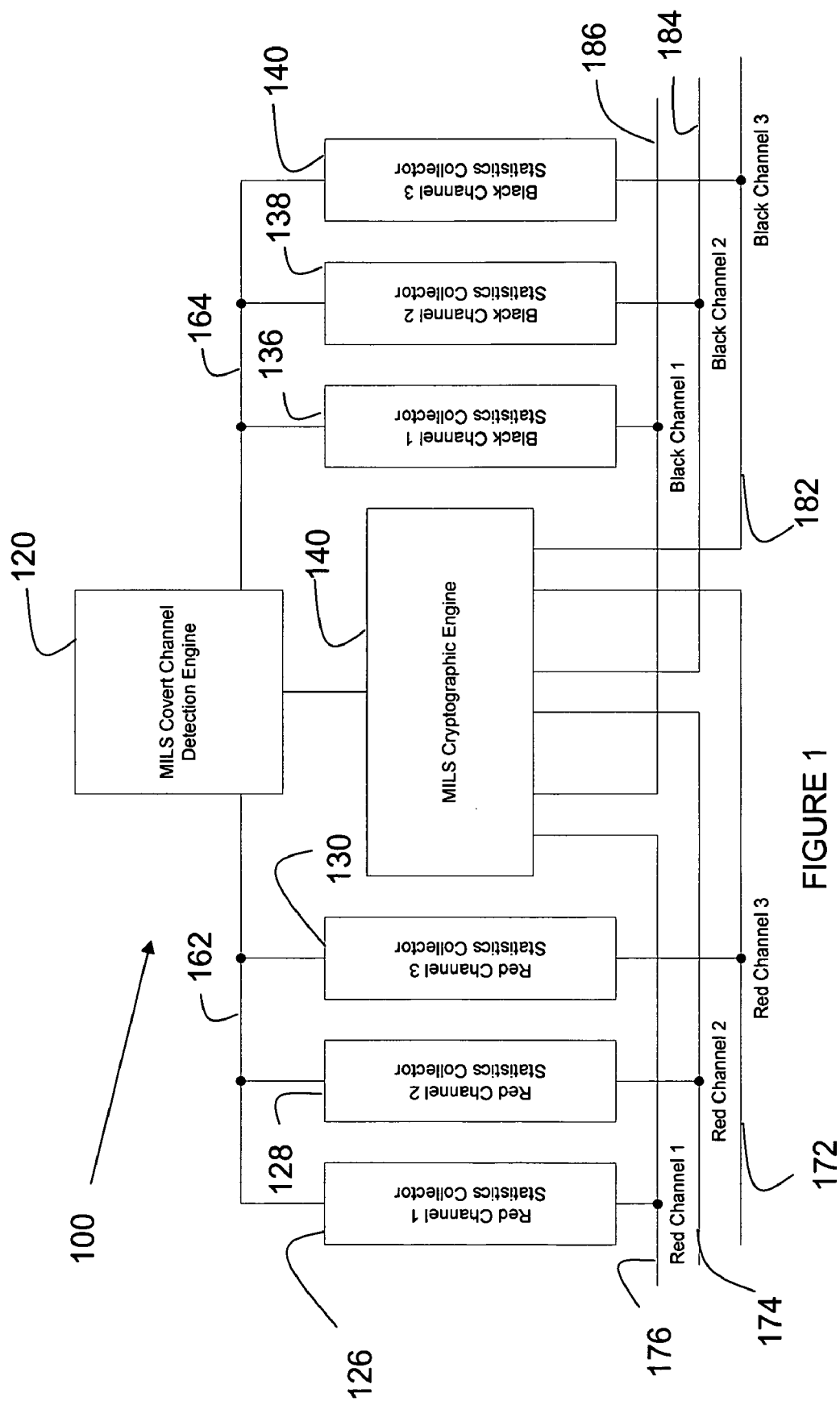
FIG. 1 is a general block diagram of an exemplary cryptographic system utilizing a covert channel detection system in accordance with an exemplary embodiment of the present invention.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawing by readily understandable block representation and schematic diagram, in order not to obscure the disclosure with structural details which will be readily apparent to those skilled in the art, having the benefit of the description herein. Further, the invention is not limited to the particular embodiments depicted in the exemplary diagram, but should be construed in accordance with the language in the claims.

With reference to FIG. 1, system 100 is a network, a computing system or communication system and includes a cryptographic engine 140, a covert channel detection engine 120, and statistic collectors, (e.g., line sniffers) 126, 128, 130, 136, 138, and 140. System 100 can be a MLS system, MILS system or MSLS system. In one preferred embodiment, system 100 is a military radio system using multiple independent levels of security. System 100 can include additional components to those shown in FIG. 1 without departing from the scope of the invention.

System 100 also includes a red channel 172, a red channel 174, a red channel 176, a black channel 182, a black channel 184 and a black channel 186. Channels 172, 174, 176, 182, 184 and 186 are coupled to cryptographic engine 140. Channels 172, 174, 176, 182, 184 and 186 can be embodied as over-the-air channels, serial interface (e.g., ethernet) channels, fiber optic channels, RS-232 channels, or other channels).

Channels 182, 184 and 186 and channels 172, 174 and 176 can have different corresponding security levels (e.g. top secret, high security, non-classified, classified, etc.). Red channels generally refer to a protected or plain text side of system 100 and black channels generally refer to an unprotected or cipher text side of the system.

Statistics collector 126 is disposed between channel 176 and engine 120. Statistics collector 128 is disposed between channel 174 and engine 120, and statistics collector 130 is disposed between channel 172 and engine 120. Statistics collector 136 is disposed between channel 186 and engine 120. Statistics collector 138 is disposed between channel 184 and engine 120, and statistics collector 140 is disposed between channel 182 and engine 120. Statistical collectors 126, 128, 130, 136, 138, and 140 collect statistical information or data and provide statistical parameters to engine 120. The statistical parameters can be related to the type, volume, and content of communications on channels 172, 174, 176, 182, 184, and 186.

Advantageously, covert channel detection engine 120 is coupled to cryptographic engine 140 and to channels 172, 174, 176, 182, 184, and 186 through statistics collectors 126, 128, 130, 136, 138, and 140. Detection engine 120 is configured to analyze the statistical parameters associated with data on channels 172, 174, 176, 182, 184, and 186 and determine if a covert channel exists.

Figure 2:
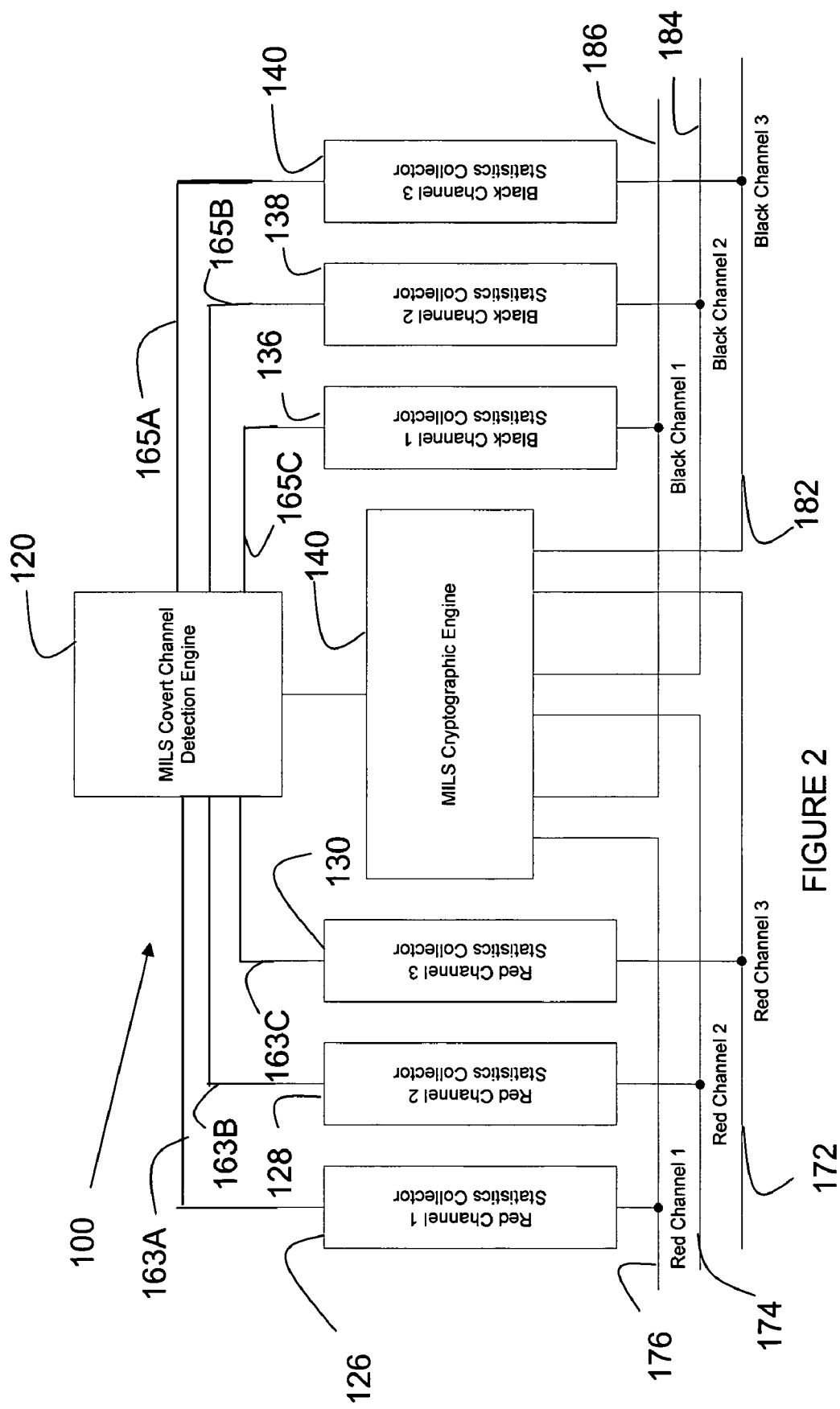
FIG. 2 is a general block diagram of an exemplary cryptographic system utilizing a covert channel detection system in accordance with another exemplary embodiment of the present invention.

A communications channel 162 allows communication between engine 120 and collectors 126, 128 and 130, and a communications channel 164 allows communication between collectors 136, 138 and 140. Channels 172, 174 and 176 are preferably separate red channels. Channels 182, 184 and 186 are preferably separate black channels. Channels 162 and 164 are preferably parallel communication channels or serial bus channels. Channels 162 and 164 can maintain independence between each of t statistics collectors 126, 128, 130, 136, 138, and 140. In one alternative embodiment, channels 162 and 164 can be replaced by channels 163A-C and 165A-C, respectively, to provide multiple communications channels as depicted in FIG. 2.

Channel 172, 174 and 176 can represent various respective security levels. For example, level 172 may be a top secret level or high security level, channel 174 can be a lower security level and channel 176 can be an unclassified level. Similarly, channel 182 can be a top secretor high security channel, channel 184 can be a lower security channel and channel 186 can be an unclassified channel.

The number of channels and types of security levels are not limited to those shown or described herein. In fact, engine 140 could be operated with the use of additional channels that have different security levels. Channels 182, 184 and 186 are preferably encrypted channels and channels 172, 174 and 176 are non-encrypted channels.

Engine 140 is preferably a MLS or MILS or MSLS cryptographic engine. Engine 140 receives data on red channels 172, 174 and 176 and encrypts it for placement on black channels 182, 184 and 186, respectively. Engine 140 also receives data or channels 182, 184 and 186 and decrypts it for placement on channels 172, 174 and 176, respectively. Engine 120 is provided on top of engine 140 to determine whether a covert channel exists.

Statistics collectors 126, 128 and 130 are coupled to channels 172, 174 and 176 to collect statistics about communications on channels 172, 174 and 176 and pass those statistics across channel 162 to engine 160. Similarly, collectors 136, 138 and 140 collect statistics on channels 186, 184 and 182, respectively, and pass the statistics across channel 164 to engine 120.

Collectors 126, 128, 130, 136, 138, and 140 can be embodied as microprocessors, field programmable gate array or hardwired circuit configured to collect data on respective channels. The statistical parameters collected by collectors 126, 128, 130, 136, 138, and 140 may range from enormous amounts of data for subsequent covert channel analysis by the covert channel engine 120, to limited specific data components or parameters gathered by the statistics collectors 126, 128, 130, 136, 138 and 140 for subsequent covert channel analysis by the covert channel engine 120.

A covert channel is basically a channel in which an individual or system passes information from a red channel to a black channel. In this way, an outsider having only access to a black channel can illegally receive information on a red channel. Generally, an entrusted insider is required to set up a covert channel. The covert channel can be utilized to superimpose information over one of black channels 182, 184 and 186 so that an outside person can remove the information without using the cryptographic techniques associated with engine 140. In this way, a non-trusted insider can provide information on a red channel across a black channel thereby allowing a person having only access to the black channel to obtain non-encrypted data in a covert fashion.

Engine 120 advantageously analyzes the statistics provided by collectors 126, 128 and 130 and 136, 138 and 140, to determine if a covert channel exists. Engine 120 can signal an alarm, notify personnel, or cease communications in system 100 if a covert channel is detected.

Alternatively, a covert channel can be achieved by installing a Trojan Horse into the system prior to equipment dispatch. In this scenario, the Trojan Horse is undetected by the operator and manifests itself by obtaining information on a red channel and sending it on a black channel. The Trojan Horse formats the information so that it can be read on the black channel. The Trojan Horse could exist in cryptographic engine 140. A computer virus could also have this same effect.

Engine 140 advantageously operates according to known cryptographic techniques and provides data from channels 172, 174 and 186 onto channels 182, 184 and 186 and vice versa. Conventional engines 140 do not have the ability to determine if header information associated with a covert channel or other bits are being added for a covert channel as it transfers information from channels 172, 174 and 176 to channels 182, 184 and 186. Generally, engine 140 is simply performing strict data-to-data encryption.

In general, cryptography is used to protect data while it is being communicated between two points or while it is stored in a medium vulnerable to physical theft. Communication security provides protection of data by enciphering it at the transmitting point and deciphering it at the receiving point. The transmitting and the receiving points may be located within the same or different devices in system 100. The key is generally available at the transmitter and receiver simultaneously during communication. The algorithms may be implemented in software, firmware, hardware, or any combination thereof. A cryptographic system such as system 100 often includes a cryptographic engine (e.g., engine 140), keying information, and operational procedures for their secure use.

Cryptographic system 100 may be utilized in various computer and communication applications including data storage, access control and personal identification, network communications, radio, facsimile, e-mail and other electronic messaging systems, audio/video/voice transmission, etc. Cryptographic system 100 may be implemented in hardware, software, and/or firmware. System 100 can perform security functions, including execution of cryptographic algorithms and key generation in support of the cryptographic algorithms. Key establishment may be performed using either electronic methods (a key loading device such as a smart card/token, PC card, or other electronic key loading device), manual methods (using a keyboard), or a combination of electronic and manual methods. Cryptographic keys can be stored in either plain text or encrypted form.

Cryptographic system 100 can execute various cryptographic algorithms that alternatively encrypt or decrypt data. Encrypting data converts it to an unintelligible form called a cipher. Decrypting the cipher converts the data back to its original form called plain text. In general, decrypting the cipher involves an inverse of the algorithm used to encrypt the data. As examples, cryptographic engine 140 can implement the data encryption standard (DES), the triple data encryption algorithm (TDEA), and/or the advanced encryption standard (AES). DES includes multiple mathematical algorithms for encrypting and decrypting binary coded information based on a binary number called a key. TDEA is a compound operation of DES encryption and decryption operations. A TDEA key consists of three DES keys. Data can be recovered from a cipher only by using exactly the same key used to encipher it. The National Security Agency (NSA) works in partnership with the National Institute of Standards and Technology (NIST) to maintain a set of cryptographic algorithms that are suitable to applications across a wide range of communicator needs. NSA defines cryptographic algorithms in 4 "types" according to the evaluated strength or origin of the algorithms. These types are:

Type 1—Certified by NSA for classified information protection

Type 2—Certified by NSA for Unclassified For Official Use Only (FOUO)

Type 3—Certified by NIST for general applications for unclassified information

Type 4—Algorithms produced by industry or other nations (no Government certification)

The programmable nature of the crypto engine should allow any level of algorithms to be implemented.

Covert channel detection engine 120 advantageously is able to determine subtle nuances in how the data is being provided across engine 140 to determine if a covert channel exists. Engine 140 can run a variety of processes to determine if a covert channel exists. For example, engine 120 can utilize mathematical comparisons of data on channels 172, 174 and 176 and 182, 184 and 186. In addition, engine 120 can look for reoccurring sequences, similar to a virus search on a home computer, to determine if certain bit set exist.

In addition, another technique would involve systematic analysis employed by engine 120 as described in "Shared Resource Matrix Methodology: An Approach to Identifying Storage and Timing Channels," IEEE Transactions on Computer Systems, v 1 no 3 (1983) by Kemmerer. Additional mathematical analyses that could be employed by engine 120 are described in "Covert Channel and Tunneling Over The HTTP Protocol Detection: GW Implementation Theoretical Design", November 2003 (v. 1.1) by Castro and "A Guide to Understanding Covert Channel Analysis of Trusted Systems", November 1993, National Computer Security Center, Ft. Mead, Md.

In a preferred embodiment, engine 120 compares statistics from collectors 126 and 136, collectors 128 and 138 and collectors 130 and 140. In one embodiment, comparisons are made only on pairs of channels due to the separate processing nature associated with engine 140 when it is a MLS or MILS engine.

Engine 140 is preferably a MLS or MILS cryptographic engine part such as an AAMP7 microprocessor coupled with a Janus encryption/decryption machine both manufactured by Rockwell Collins, Inc. Engine 120 can be embodied as software operating on a Rockwell Collins AAMP7 microprocessor. Alternatively, engine 120 can be embodied as software operating on commercial-off-the-shelf processors such as multiple IBM PowerPC®'s arranged as a MSLS engine 120. Alternative platforms for engine 140 include the Harris Sierra™ platform and General Dynamics AIM™ platform.

The use of engine 120 provides a cost effective solution for MLS or MILS covert channel detection engines in conjunction with statistical collection devices.

Engine 120 can be implemented utilizing a MLS or MILS microprocessor such as the AAMP7 microprocessor operating in a MILS mode. The AAMP7 microprocessor achieves this by utilizing a partitioned structure enforcing strict rules between each partition.

Engine 120 can utilize signature, protocol and behavioral based analysis to determine if a covert channel exists. The engine 120 preferably maintains red to black and channel to channel data separation.

Devices in a network or system 100 are connected by communication paths and channels 126, 128, 130, 136, 138, 140, 182, and 184 that may be wired or wireless. System 100 can also connect with a number of networks.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A communication system for analyzing electronic communications to determine a presence of a covert channel, the communication system comprising:
a cryptographic engine for coupling to a plurality of communication channels, the communication channels including a plurality of encrypted channels and a plurality of non-encrypted channels, wherein each of the encrypted channels is associated with a non-encrypted channel in a respective pair of the channels;

a plurality of statistic collectors, each for respectively coupling to the communication channels; and a covert channel detector coupled to the statistic collectors, wherein the covert channel detector analyzes data in electronic form from at least one of the statistic collectors to determine the presence of the covert channel, wherein the data includes at least one statistical parameter for each encrypted channel and non-encrypted channel in the respective pair, wherein the statistical parameter for each encrypted channel and non-encrypted channel in the respective pair is compared to determine the presence of the covert channel.

2. The communication system of claim 1 wherein the cryptographic engine is interfaced with the covert channel detector.

3. The communication system of claim 1, wherein the covert channel detector and the cryptographic engine operate on the same microprocessor platform.

4. The communication system of claim 1, wherein the covert channel detector and the cryptographic engine operate on distinct microprocessor platforms.

5. The communication system of claim 1, wherein the platforms are AAMP7 microprocessors.

6. The communication system of claim 1, wherein the cryptographic engine and covert channel detector are JAVA programs.

7. The communication system of claim 1, wherein the covert channel detector uses a sequence algorithm or a mathematical comparison algorithm.

8. The communication system of claim 1, wherein the covert channel is coupled to the cryptographic engine and stops the cryptographic engine when a covert channel is detected.

9. A method of providing communications in a multiple independent level security (MILS) or multiple independent single levels of security (MSLS) communication system, the method comprising:

encrypting signals for a plurality of encrypted channels, each of the plurality of encrypted channels being at a particular security level;

decrypting signals for a plurality of decrypted channels, each of the plurality of decrypted channels being at a respective security level corresponding to the particular security level associated with one of the encrypted channels;

collecting statistics on each of the decrypted channels and encrypted channels; and analyzing the statistics to determine a presence of a covert channel, wherein the statistics includes at least one statistical parameter for each encrypted channel and decrypted channel, wherein the statistical parameter for each encrypted channel and decrypted channel at each security level is compared to determine the presence of the covert channel.

10. The method of claim 9, wherein the analyzing includes using a virus detection-type algorithm.

11. The method of claim 9, further wherein the method is performed on a single processing platform.

12. The method of claim 11, wherein the processing platform operates software for a covert channel detector and a MILS cryptographic engine.

13. The method of claim 12, wherein the covert channel detector is coupled to a statistics collector.

14. The method of claim 9, wherein the analyzing uses a code sequence finding algorithm.

15. The method of claim 9, wherein the analyzing uses a mathematical comparison of statistics.

16. The method of claim 9, wherein the statistics are provided to a covert channel detector on separate detector channels associated with each security level.

17. An apparatus comprising:

means for providing encrypted communication on a plurality of encrypted channels and for providing communication on a plurality of non-encrypted channels;

means for collecting statistics regarding communications on the encrypted channels and non-encrypted channels, wherein each of the encrypted channels is associated with a non-encrypted channel of the non-encrypted channels as a respective pair of the channels; and means for analyzing the statistics to determine a presence of a covert channel, wherein the statistics includes at least one statistical parameter for each encrypted channel and non-encrypted channel in the respective pair, wherein the statistical parameter for each encrypted channel and non-encrypted channel in the respective pair is compared to determine the presence of the covert channel.

18. The apparatus of claim 17, wherein the apparatus includes an AAMP7 microprocessor.

19. The apparatus of claim 17, wherein the encrypted channels include at least three black channels.

20. The apparatus of claim 17, wherein the presence is determined automatically.

* * * * *